(12) United States Patent
Brevick et al.

(10) Patent No.: US 9,512,897 B2
(45) Date of Patent: Dec. 6, 2016

(54) CRANKSHAFT PENDULUM ASSEMBLY HAVING KIDNEY-SHAPED TRACK

(71) Applicant: Ford Global Technologies, LLC, Dearborn, MI (US)

(72) Inventors: John Edward Brevick, Livonia, MI (US); Wayne Paul Woodside, Ypsilanti, MI (US); Jeffrey Eliot Chottiner, Farmington Hills, MI (US); Rick L. Williams, Canton, MI (US); Frank Hanson, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/327,926

(22) Filed: Jul. 10, 2014

(65) Prior Publication Data
US 2016/0010720 A1    Jan. 14, 2016

(51) Int. Cl.
*F16C 3/06* (2006.01)
*F16F 15/14* (2006.01)

(52) U.S. Cl.
CPC .................................. *F16F 15/145* (2013.01)

(58) Field of Classification Search
CPC ........ F16F 15/283; F16F 15/28; F16F 15/264; F16F 15/145; F16F 15/14; F02B 75/06
USPC .............................. 123/192.1, 192.2; 74/604
See application file for complete search history.

(56) References Cited

U.S. PATENT DOCUMENTS

| | | | | |
|---|---|---|---|---|
| 2,272,189 A * | 2/1942 | De Pew | | 74/604 |
| 2,332,072 A * | 10/1943 | Gregory et al. | | 74/604 |
| 4,739,679 A * | 4/1988 | Berger et al. | | 74/574.3 |
| 5,884,735 A * | 3/1999 | Eckel et al. | | 188/378 |
| 6,450,065 B1 * | 9/2002 | Eckel et al. | | 74/574.4 |
| 6,688,272 B2 * | 2/2004 | Brevick et al. | | 123/192.2 |
| 8,813,604 B2 * | 8/2014 | Geist et al. | | 74/604 |
| 2012/0031226 A1 | 2/2012 | Jung | | |
| 2013/0098198 A1 | 4/2013 | Geist et al. | | |
| 2013/0239745 A1 | 9/2013 | Maienschein et al. | | |
| 2014/0053680 A1 * | 2/2014 | Wakeman | | 74/604 |

\* cited by examiner

*Primary Examiner* — Marguerite McMahon
(74) *Attorney, Agent, or Firm* — LeClairRyan

(57) ABSTRACT

A pendulum crankshaft assembly for an internal combustion engine includes a pendulum carrier, a pendulum and rolling pins. The carrier and the pendulum have kidney-shaped rolling pin tracks. The rolling pin tracks are kidney-shaped and thus are defined by opposed curved side walls and opposed end walls. The pendulum carrier has an ear extending therefrom to which the pendulum is attached. The pendulum comprises a first half and a second half, each half being positioned on the sides of the ear. At any given time in operation, the gap between the rolling pin and the opposed walls of the rolling pin tracks is never greater than 0.5 mm. The pendulum carrier is attached to a cheek of the crankshaft by a pair of opposed fasteners.

20 Claims, 4 Drawing Sheets

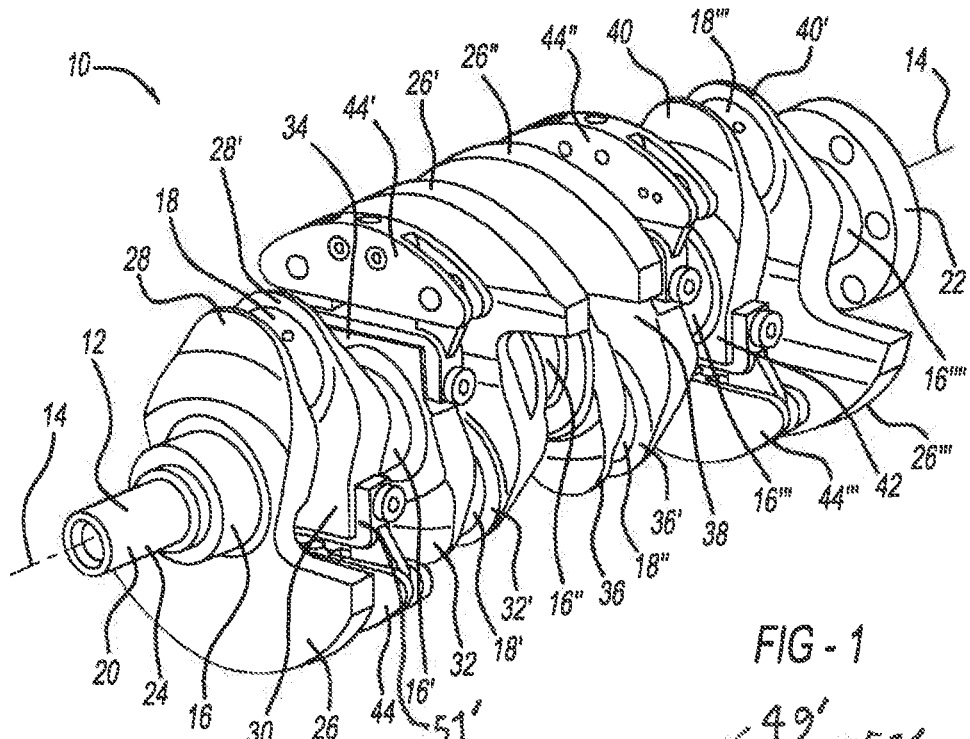

CRANKSHAFT PENDULUM ASSEMBLY HAVING KIDNEY-SHAPED TRACK

TECHNICAL FIELD

The disclosed inventive concept relates generally to pendulum crankshafts for internal combustion engines. More particularly, the disclosed inventive concept relates to kidney-shaped rolling pin tracks formed in the pendulum carrier assembly.

BACKGROUND OF THE INVENTION

Internal combustion engines having a relatively small number of cylinders provide automobile makers with an attractive solution to the need for improved fuel economy. In order to compensate for reduction of cubic capacity, vehicle manufacturers developed technologies to improve engine power, such as direct fuel injection, turbocharging, and variable timing for inlet and exhaust camshafts. In this way six- and eight-cylinder engines can be scaled down without losing available horsepower.

An undesirable consequence of engines with a small number of cylinders is high crankshaft torsional vibration and high engine block vibration caused by forces, such as first and second engine order forces, that are not cancelled. Such torsional vibrations are ultimately transmitted through the engine mounts and to the vehicle structure.

Engineers managed these vibrations to one extent or another through a variety of approaches, many of which increase the cost of construction and reduce fuel economy. One accepted solution to overcome excessive vibration is the provision of one or more pendulums on the crankshaft to lower the torsional vibration of the crankshaft and the consequent vehicle noise and harshness. Such crankshaft-mounted pendulums function as vibration absorbers as they are tuned to address and thus reduce vibrations generated by oscillating torque, thereby smoothing torque output of the crankshafts. This approach is taken as well by designers of some airplane piston engines where the pendulums smooth output torque and reduce stress within the crankshaft itself.

An example of a pendulum vibration absorber associated with an engine crankshaft is set forth in U.S. Pat. No. 4,739,679, assigned to the assignee of the instant application. According to the arrangement set forth in this patent, a pendulum includes an inner curved cam follower surface that is alternately engaged and disengaged from a pin type cam fixed on the pendulum carrier.

The crankshaft pendulum is interconnected with the pendulum carrier by pairs of rollers that are movable on mating curved tracks. While there are a number of variations of the movable relationship between the pendulum and the crankshaft, it is common to incorporate rolling pins as the points of contact between these two components.

Each rolling pin requires a pendulum rolling pin track in which the rollers can roll. Known rolling pin tracks have great distances between the walls of the track and the rolling pin. When the engine is running and the crankshaft is rotating, centrifugal force keeps the pendulum in its outward position. However, when the engine is turned off and rotational movement of the crankshaft stops, centrifugal motion stops as well and the pendulum, no longer held in its fully outward position, may experience a drop caused by gravity if the stopped position of the pendulum is "up" or is generally above the midline of the crankshaft. If the pendulum is stopped in this position, then it will drop a distance of over 3.0 mm before hitting metal-on-metal, thus increasing undesirable NVH in the engine and, consequently, in the vehicle.

To compensate for this drop, rubber bumpers are strategically located on the pendulum carrier to dampen the metal-on-metal contact. The use of such corrective measures not only adds to manufacturing and material cost, but also creates a risk of clogged oil lines by particles of rubber due to the degradation of the rubber over time.

Thus a new approach to the pendulum crankshafts is needed to address the problems associated with known arrangements.

SUMMARY OF THE INVENTION

The disclosed inventive concept overcomes the challenges faced by known pendulum crankshaft arrangements for internal combustion engines by providing a maximum "drop" gap of less than 0.5 mm between the rolling pin and the walls of the carrier and pendulum tracks. When the engine is turned off and the rotational movement of the crankshaft ceases along with the centrifugal force acting on the pendulum, the small drop experienced by the pendulum when stopped in its "up" position results in reduced NVH.

The pendulum assembly for attachment to the crankshaft of an internal combustion engine of the disclosed inventive concept comprises a pendulum carrier attachable to the crankshaft, a pendulum movably attached to the carrier, and a rolling pin. The pendulum carrier and the pendulum each have rolling pin tracks formed therein in which the rolling pin is movably fitted.

The rolling pin tracks are kidney-shaped and thus are defined by opposed curved side walls and opposed end walls. At any given time in operation, the gap between the rolling pin and the opposed walls of the rolling pin tracks is never greater than 0.5 mm. If the crankshaft stops with the pendulum in its "up" position, the resulting pendulum drop is limited to a distance of 0.5 mm or less until it hits the indentation of the rolling track and rolls to its resting position.

The pendulum carrier has an ear extending therefrom to which the pendulum is attached. The pendulum comprises a first half and a second half, each half being positioned on the sides of the ear.

The pendulum carrier is attached to a cheek of the crankshaft by a pair of opposed fasteners.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 is a perspective view of a crankshaft having kidney-shaped rolling pin tracks formed in the carrier and pendulum according to the disclosed inventive concept;

FIG. 2 is a side view of a portion of a crankshaft cheek of the crankshaft of FIG. 1 having an attached carrier and pendulum in which the kidney-shaped rolling pin tracks are formed;

DETAILED DESCRIPTION OF THE PREFERRED EMBODIMENT

Figure 3:
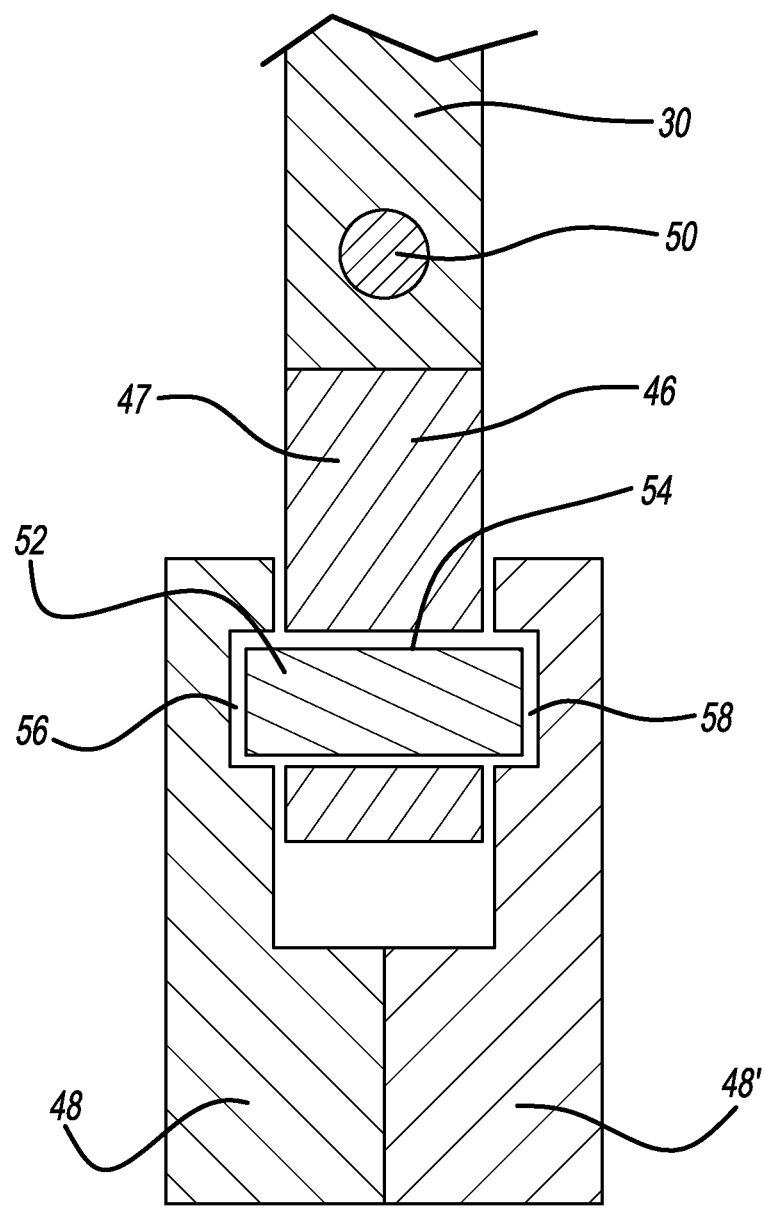
FIG. 3 is a sectional view of the portion of the crankshaft cheek and the attached carrier and pendulum taken along line 3-3 of FIG. 2.

In the following figures, the same reference numerals will be used to refer to the same components. In the following description, various operating parameters and components are described for different constructed embodiments. These specific parameters and components are included as examples and are not meant to be limiting.

Referring to FIG. 1, a crankshaft assembly for an internal combustion engine is illustrated. It is to be understood that the overall configuration of the illustrated crankshaft assembly, generally illustrated as 10 in FIG. 1, is set forth for suggestive purposes only as the overall configuration may be altered from that illustrated.

The crankshaft assembly 10 includes a crankshaft 12. The crankshaft 12 has a rotational axis 14. Rotation of the crankshaft 12 about its rotational axis 14 is made possible by the provision of main journals 16, 16', 16", 16''' and 16''''. The journals 16, 16', 16", 16''' and 16'''' are integrally formed as part of the crankshaft 10 and are restrained within the engine block (not shown) by crankshaft bearings (not shown).

The connecting rods (not shown) are attached as is known in the art to rod journals 18, 18', 18" and 18''' by rod bearings. The rod journals 18, 18', 18" and 18''' are integrally formed on the crankshaft 12, again as is known in the art.

The crankshaft 12 includes a first end 20 and a second end 22. Conventionally provided extending from one end, in this case the first end 20, is a post 24. The post 24 serves as a mount for any number of engine components, such as a damper, a fan belt pulley and a drive mechanism for a camshaft. None of these components is shown but these components and their methods of attachment are known to those skilled in the art.

Conventionally attached to the other end of the crankshaft 12, in this case the second end 22, is a flywheel (not shown). The flywheel, which assists in reducing torsional fluctuations in the crankshaft 12, is in operative engagement with the drive shaft or transaxle of the vehicle.

Counterweights 26, 26', 26" and 26''' are formed as integral components of the crankshaft 12. It is understood that the conventional modern internal combustion engine includes one or more such counterweights to provide balance to the connecting rods, the pistons, and the crankshaft 12, thereby reducing the loads on the main journals.

To each side of the rod journal 18 is provided a spaced apart pair of crank webs 28 and 28'. Extending from the crank web 28 is the counterweight 26. Extending from the crank web 28' is a crankshaft cheek 30.

To each side of the rod journal 18' is provided a spaced apart pair of crank webs 32 and 32'. Extending from the crank web 32 is a crankshaft cheek 34. Extending from the crank web 32' is the counterweight 26'.

To each side of the rod journal 18" is provided a spaced apart pair of crank webs 36 and 36'. Extending from the crank web 36 is the counterweight 26". Extending from the crank web 36' is a crankshaft cheek 38.

To each side of the rod journal 18''' is provided a spaced apart pair of crank webs 40 and 40'. Extending from the crank web 40 is a crankshaft cheek 42. Extending from the crank web 40' is the counterweight 26'''.

A pendulum carrier assembly 44 is attached to the crankshaft cheek 30. A pendulum carrier 44' is attached to the crankshaft cheek 34. A pendulum carrier 44" is attached to the crankshaft cheek 38. A pendulum carrier 44''' is attached to the crankshaft cheek 42.

FIG. 2 is a side view of a portion of the crankshaft cheek 30 of the crankshaft 10 of FIG. 1. The crankshaft cheek 30 includes two sides 49 and 49'. FIG. 3 is a sectional view of the portion of the crankshaft cheek 30, an attached carrier 46 having a carrier ear 47 and pendulum halves 48 and 48' taken along line 3-3 of FIG. 2. The pendulum carrier assembly 44 is attached to the crankshaft cheek 30 by the pendulum carrier 46. The pendulum half 48 is attached to the carrier ear 47 of the pendulum carrier 46. The other pendulum half 48' (shown in FIG. 3) is attached to the pendulum half 48 on assembly. The pendulum carrier 46 is attached directly to the crankshaft cheek 30 by a pair of spaced-apart, opposed shoulder bolts 50 and 50' that extend through spaced-apart arms 51 and 51' (shown in FIG. 2) that extend vertically from the pendulum carrier 46 for attachment to the sides 49 and 49' of the crankshaft check 30. (One of the spaced-apart arms, arm 51', is shown in FIG. 1.)

Fitted perpendicularly between each pendulum half 48 and 48' are rolling pins 52 and 52'. The rolling pins 52 and 52' travel in kidney-shaped rolling pin tracks 54 and 54' formed in the carrier ear 47 of the carrier 46 and kidney-shaped rolling pin tracks 56 and 56' formed in the pendulum half 48. A like pair of kidney-shaped rolling tracks are formed in the pendulum half 48', of which a kidney-shaped rolling pin track 58 shown in FIG. 3. The kidney-shaped rolling tracks 56 and 56' of the pendulum half 48 are inverted with respect to the kidney-shaped rolling pin tracks 54 and 54' formed in the carrier ear 47 of the carrier 46, thus allowing the pendulum motion of the pendulum half 48 and the pendulum half 48' relative to the carrier 46.

Figure 4:
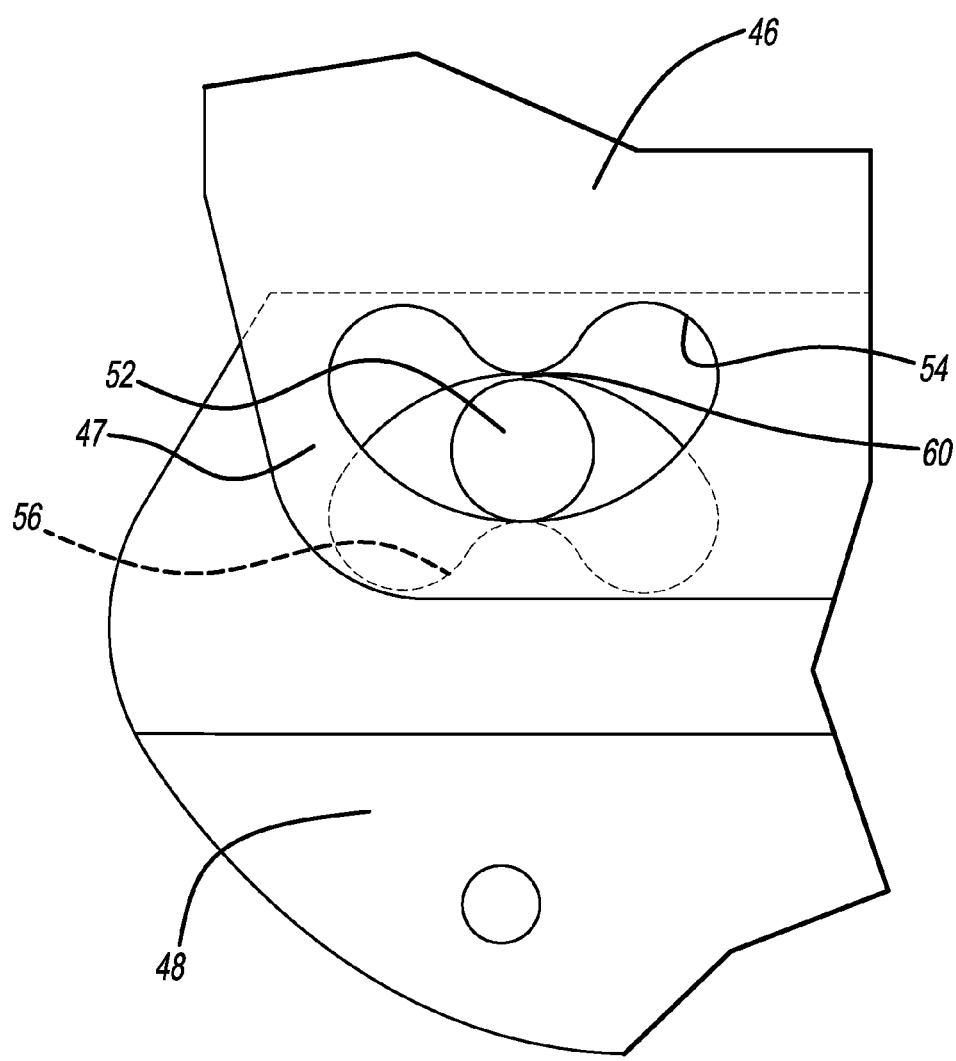
FIG. 4 is a close-up side view illustrating the kidney-shaped rolling pin track in the carrier and in partial broken lines in the pendulum wherein the pendulum is in its centered position.

FIG. 4 is a close up side view of the kidney-shaped rolling track 54 and the kidney-shaped rolling track 56 where the rolling pin 52 is in its centered position. In this position and in the event that the centrifugal force is reduced such as during engine shut down, the pendulum halves 48 and 48' would experience a "drop" whereby the pendulum halves 48 and 48' are pulled away from the carrier 46. In this position, a gap 60 of less than 0.5 mm is formed between the rolling pin 52 and the walls of the kidney-shaped rolling track 54 and the kidney-shaped rolling track 56, thus minimizing NVH and eliminating the need for bumpers or other impact-dampening elements.

Figure 5:
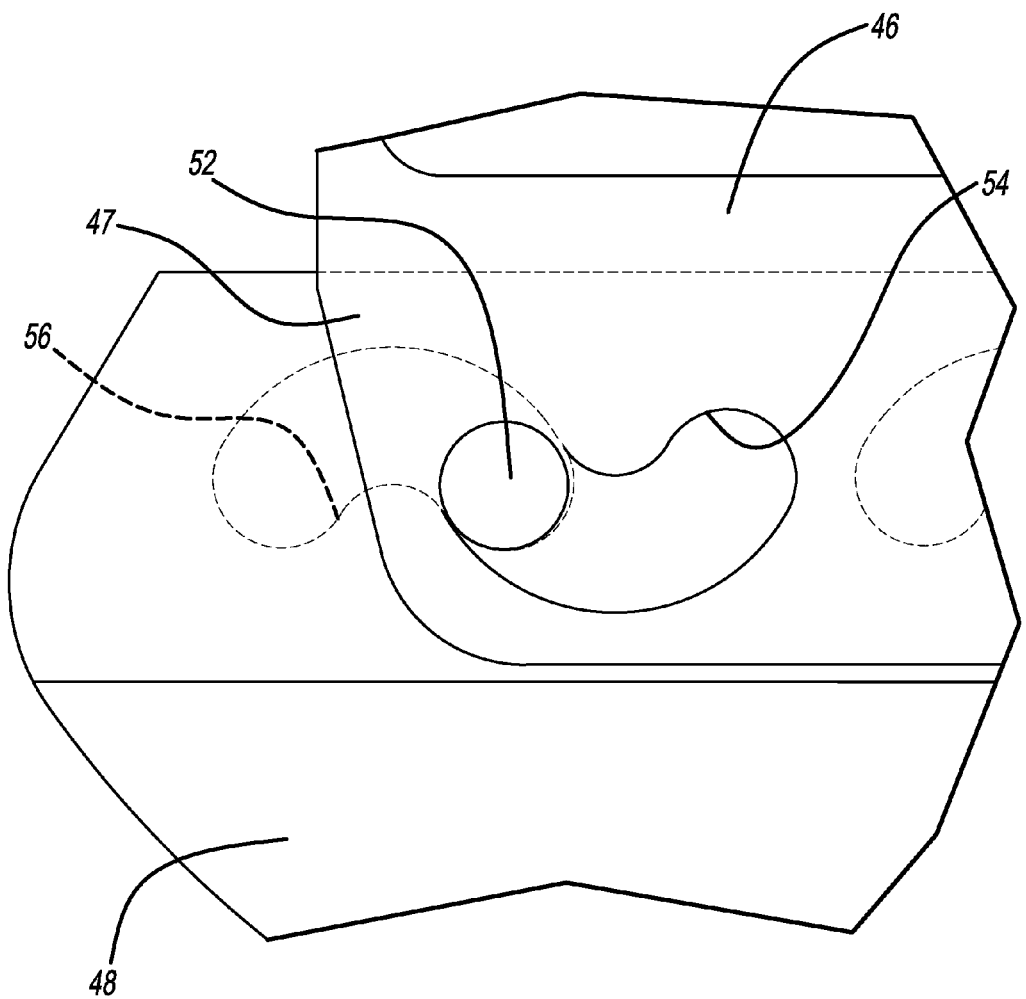
FIG. 5 is a view similar to that of FIG. 4 wherein the pendulum is at its full outward central position.

While FIG. 4 illustrates the rolling pin 52 in its central position with respect to the kidney-shaped rolling track 54 and the kidney-shaped rolling track 56, it is to be understood that the rolling pin 52 is movable within the kidney-shaped rolling tracks 54 and 56. FIG. 5 illustrates movement of the pendulum half 48 to its full outward central position relative to the carrier 46 whereby the rolling pin 52 is positioned at one end of the kidney-shaped track 54 and at one end of the kidneys-shaped track 56.

The disclosed inventive concept as set forth above overcomes the challenges faced by known pendulum crankshaft arrangements for internal combustion engines by providing a maximum "drop" gap between the rolling pin and the walls of the pendulum tracks. Accordingly, one skilled in the art will readily recognize from such discussion, and from the accompanying drawings and claims that various changes, modifications and variations can be made therein without departing from the true spirit and fair scope of the invention as defined by the following claims.

What is claimed is:

1. A pendulum crankshaft assembly for an internal combustion engine comprising:
   a crankshaft having a crankshaft cheek, said cheek having opposed sides;
   a pendulum carrier having a pair of spaced-apart, vertically-extending arms for attachment to said sides of said cheek;
   a fastener extending perpendicularly to said crankshaft for attaching said attachment arms to said crankshaft cheek;
   a pendulum attached to said pendulum carrier; at least one of said carrier and said pendulum having a kidney-shaped track formed therein, said track having a wall;
   a rolling pin positioned in said track for connecting said pendulum to said carrier; and
   a gap of less than 0.5 mm formed between said rolling pin and said wall.

2. The pendulum crankshaft assembly for an internal combustion engine of claim 1 wherein said pendulum carrier has a kidney-shaped track formed therein and said pendulum has a kidney-shaped track formed therein.

3. The pendulum crankshaft assembly for an internal combustion engine of claim 2 wherein said kidney-shaped track formed in said pendulum carrier is inverted with respect to said kidney-shaped track formed in said pendulum.

4. The pendulum crankshaft assembly for an internal combustion engine of claim 3 wherein said carrier includes an ear and wherein said kidney-shaped track is formed in said ear.

5. The pendulum crankshaft assembly for an internal combustion engine of claim 4 wherein said pendulum is comprised of a first pendulum half and a second pendulum half.

6. The pendulum crankshaft assembly for an internal combustion engine of claim 5 wherein said kidney-shaped tracks of said pendulum are formed in each of said halves.

7. The pendulum crankshaft assembly for an internal combustion engine of claim 6 further includes two rolling pins and wherein said carrier includes two kidney-shaped tracks and said pendulum includes two kidney-shaped tracks, and wherein said pendulum does not contact any bumpers or other impact-dampening elements.

8. A pendulum assembly for attachment to the crankshaft of an internal combustion engine, the crankshaft having a long axis and a crankshaft cheek, the assembly comprising:
   a pendulum carrier having a pair of spaced-apart, vertically-extending arms for attachment to the crankshaft cheek;
   a fastener extending perpendicularly to the long axis of the crankshaft for attaching said attachment arms to said crankshaft cheek;
   a pendulum movably attached to said carrier;
   a kidney-shaped track formed in at least one of said carrier and said pendulum, said track having a wall;
   a rolling pin fitted in said kidney-shaped track for connecting said pendulum to said carrier; and
   a gap of less than 0.5 mm defined between said rolling pin and said wall.

9. The pendulum assembly of claim 8 wherein said kidney-shaped track is formed in said carrier and in said pendulum.

10. The pendulum assembly of claim 9 wherein said kidney-shaped track formed in said carrier is inverted with respect to said kidney-shaped track formed in said pendulum.

11. The pendulum assembly of claim 10 wherein said carrier has a carrier ear and wherein said kidney-shaped track is formed in said carrier ear.

12. The pendulum assembly of claim 11 wherein said pendulum comprises a pendulum half and a second pendulum half.

13. The pendulum assembly of claim 12 wherein said kidney-shaped track formed in said pendulum is formed in said first pendulum half and in said second pendulum half.

14. The pendulum assembly of claim 13 wherein said pendulum does not contact any bumpers or other impact-dampening elements.

15. A pendulum assembly for attachment to the crankshaft of an internal combustion engine, the crankshaft having a long axis and a crankshaft cheek, the assembly comprising:
   a pendulum carrier having a pair of spaced-apart, vertically-extending arms for attachment to the crankshaft cheek;
   a fastener extending perpendicularly to the long axis of the crankshaft for attaching said attachment arms to said crankshaft cheek;
   a pendulum attached to said carrier, said carrier and said pendulum each having a rolling pin track defined by opposed curved side walls and opposed end walls;
   a rolling pin movably positioned in said tracks for connecting said pendulum to said carrier; and
   a gap of less than 0.5 mm defined between said rolling pin and said walls.

16. The pendulum assembly of claim 15 wherein said rolling pin track in said carrier is inverted with respect to said rolling pin track formed in said pendulum.

17. The pendulum assembly of claim 16 wherein said carrier has a carrier ear and wherein said rolling pin track is formed in said carrier ear.

18. The pendulum assembly of claim 17 wherein said pendulum comprises a pendulum half and a second pendulum half.

19. The pendulum assembly of claim 18 wherein said rolling pin track formed in said pendulum is formed in said first pendulum half and in said second pendulum half.

20. The pendulum assembly of claim 19 wherein said pendulum does not contact any bumpers or other impact-dampening elements.

* * * * *